(No Model.) 5 Sheets—Sheet 2.
W. SYDENHAM, F. WATKINSON & A. SYDENHAM.
DRIVING GEAR FOR MOTOR CARS.
No. 606,311. Patented June 28, 1898.
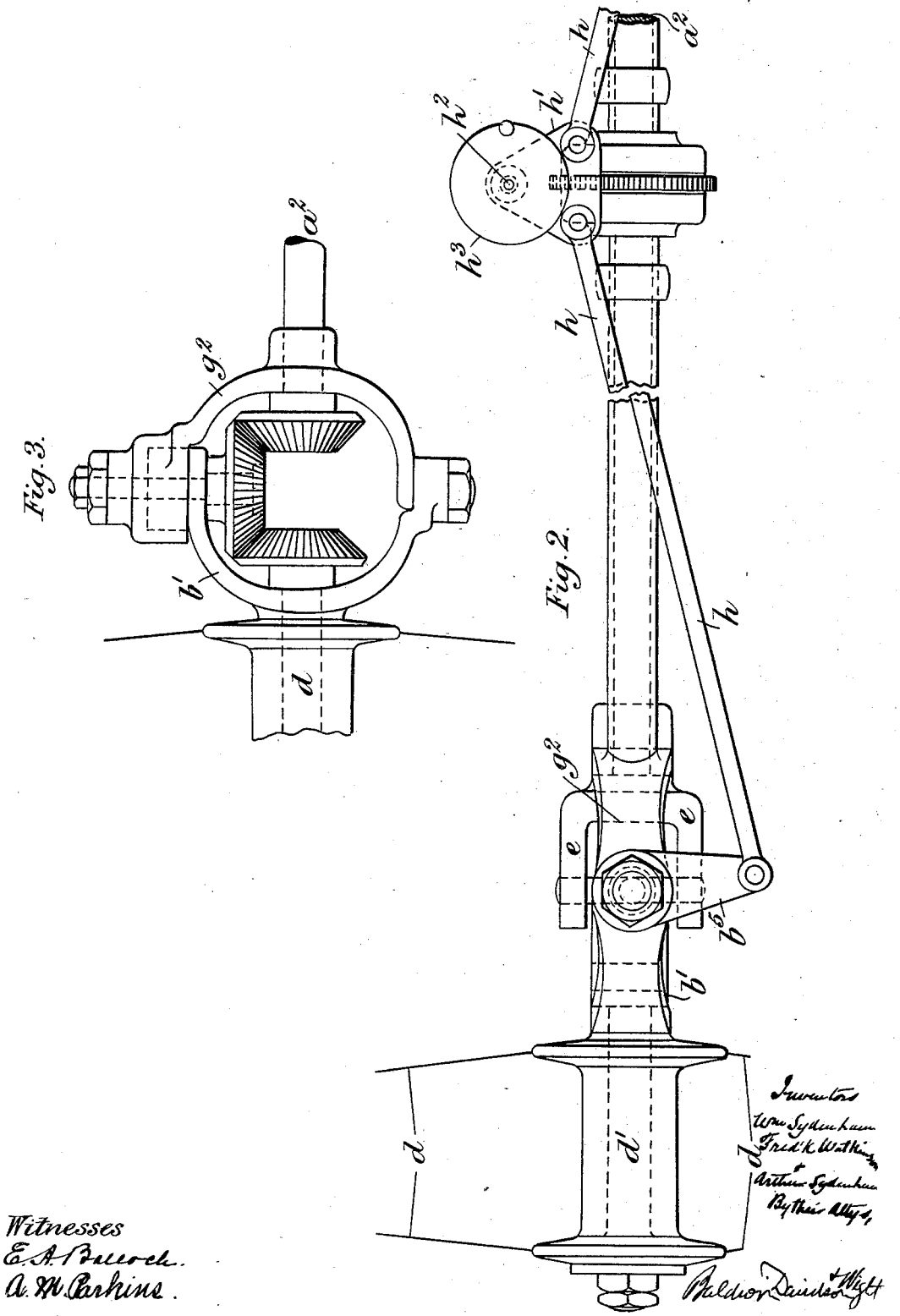
Witnesses
E. A. Bulloch
A. M. Parkins
Inventors
Wm Sydenham
Fred'k Watkinson
Arthur Sydenham
By their Attys
Baldwin Davidson & Wight

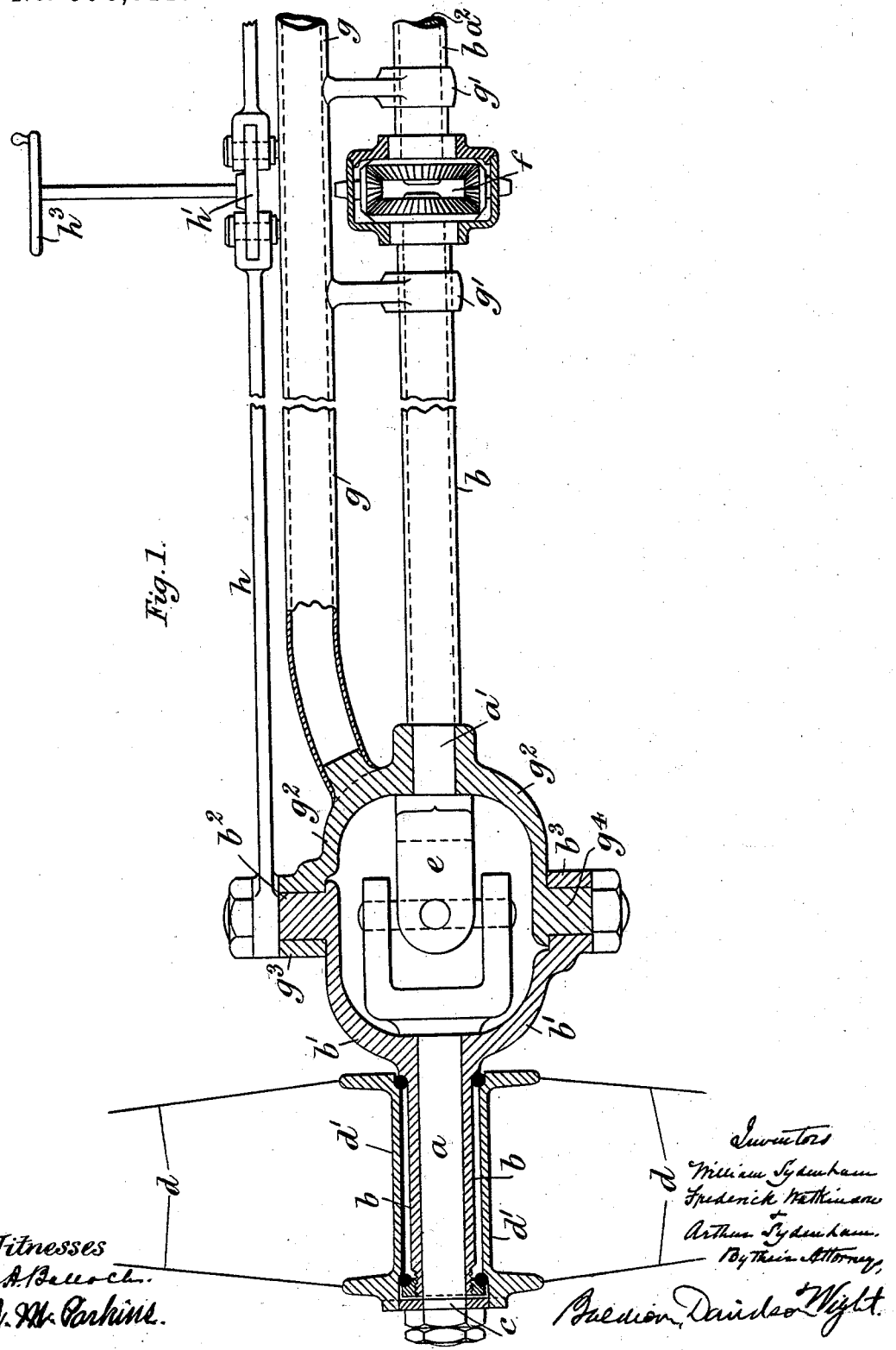

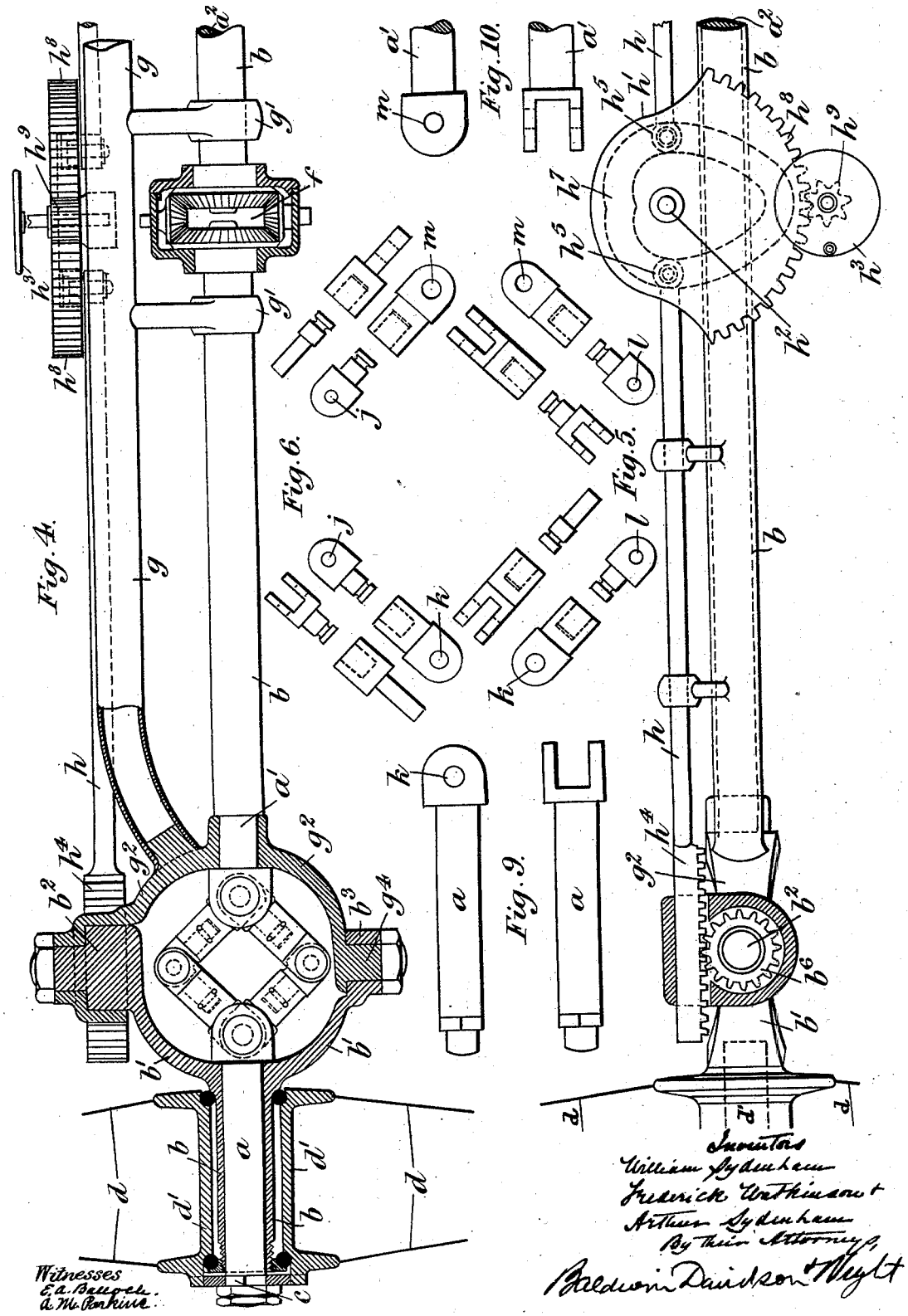

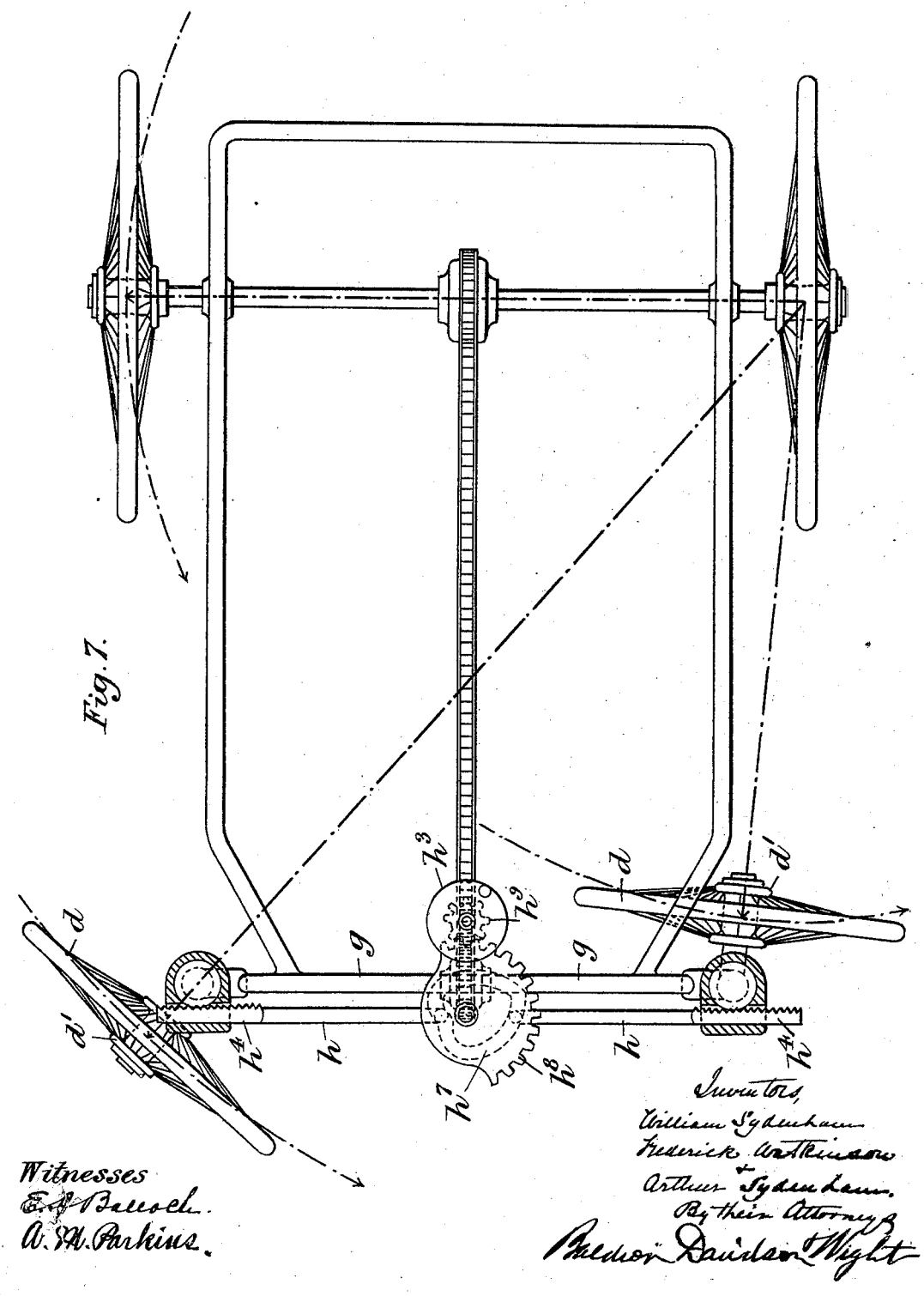

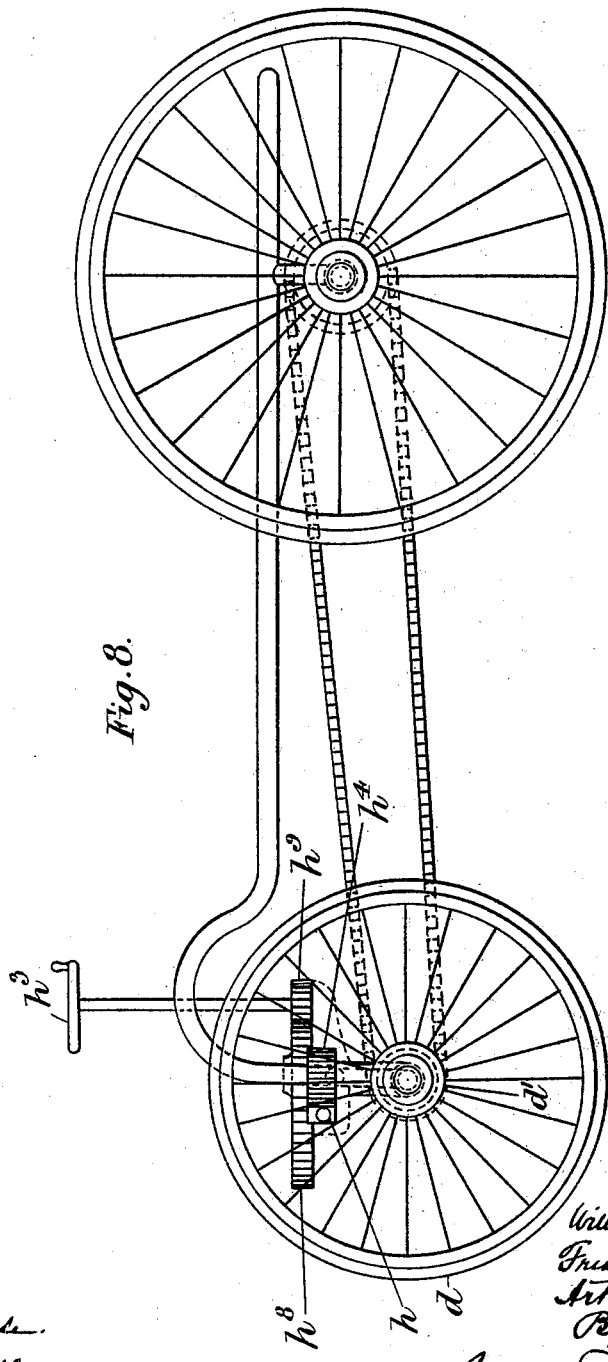

UNITED STATES PATENT OFFICE.

WILLIAM SYDENHAM, FREDERICK WATKINSON, AND ARTHUR SYDENHAM, OF LONDON, ENGLAND.

DRIVING-GEAR FOR MOTOR-CARS.

SPECIFICATION forming part of Letters Patent No. 606,311, dated June 28, 1898.

Application filed November 18, 1897. Serial No. 659,015. (No model.)

*To all whom it may concern:*

Be it known that we, WILLIAM SYDENHAM, residing at 5 Ann street, Union Square, Islington, FREDERICK WATKINSON, residing at Prah road, Finsbury Park, both in the county of Middlesex, and ARTHUR SYDENHAM, residing at 29 Clerkenwell road, in the city of London, England, subjects of the Queen of Great Britain, have invented certain new and useful Improvements in Driving-Gears for Motor-Cars and other Vehicles, of which the following is a specification.

The object of this invention is to drive all the wheels of the vehicle, although their axes can be made to radiate to a point for steering. For this purpose the axle (which is driven in any convenient manner) is divided into four parts. The two middle parts are connected together at one end by differential gear, (so that in turning the outer wheel revolves faster than the inner one,) while their other ends are each connected to one of the outer parts of the axle by a universal joint.

Figure 1 is a vertical longitudinal section, partly in elevation, of the axle and steering-gear; and Fig. 2 is a plan. Figs. 3 to 8 show modifications.

These figures show three of the four parts of the axle—namely, $a\ a'\ a^2$. The fourth part, which is not shown, is to the right of the figures and is similar to $a$.

The parts $a$ are free to turn in sleeves $b$ and at their outer ends carry pins or cross-bars $c$, engaging with slots on the hubs $d'$ of the wheels $d$, so that the wheels turn with the axles. The inner ends of the shafts $a$ are connected by "Hooke" joints $e$ to the outer ends of the shafts $a'$, whose inner ends are connected by differential gear $f$. The shafts $a'$ work in bearings $g'$, fixed to the frame $g$ of the machine. $g^2$ is a fork, also fixed to the frame. At the top it carries a bearing $g^3$ and at the bottom a stud $g^4$.

The sleeves $b$ have forks $b'$ at one end, carrying studs $b^2$, working in the bearings $g^3$, and also bearings $b^3$ to receive the studs $g^4$.

$b^5$ are levers rigidly fixed to the studs $b^2$ and connected by the rods $h$ to the plate $h'$, which can be turned about a pivot $h^2$ by the hand-wheel $h^3$.

The arrangement above described is not suitable when it is desired to turn the wheels through large angles, and in such cases the Hooke joint $e$ may be replaced by beveled pinions, as shown in Fig. 3; but we prefer to adopt the arrangements shown at Figs. 4 to 10, Figs. 4 and 5 being similar views to Figs. 1 and 2, Fig. 6 showing some of the parts separately, and Figs. 7 and 8 by a plan and side elevation, of the carriage. In this arrangement the Hooke joint is replaced by a special form of universal joint, consisting of rods jointed together in the form of a parallelogram each of the sides of which is made in two parts free to turn axially the one upon the other. Fig. 6 gives two views at right angles to each other of each of the parts separated from each other. These parts are pin-jointed to each other at $j\ k\ l\ m$. The method of turning the wheels is also modified. The studs $b^2$ have fixed to them pinions $b^6$, gearing with racks $h^4$ on the rods $h$, whose other ends carry rollers $h^5$, engaging with a cam-groove $h^7$ on the plate $h'$, which is provided with teeth $h^8$, gearing with a pinion $h^9$, fixed to the shaft of the hand-wheel $h^3$. By this means the different angles through which the two wheels have to be turned can be very accurately adjusted.

What we claim is—

1. The combination of the four parts of the axle, differential gear connecting the two middle parts, parallelograms connecting the middle and outer parts, joints at the angles of the parallelograms and axial joints in their sides.

2. The combination of the four parts of the axle, differential gearing connecting the two middle parts, universal joints connecting the middle and outer parts, four sleeves forming bearings for the four parts of the axle, vertical joints connecting the outer and middle sleeves, and means for turning the outer sleeves about the joints.

3. The combination of the four parts of the axle, differential gear connecting the two middle parts, parallelograms connecting the middle and outer parts, joints at the angles of the parallelograms, axial joints in their sides, four sleeves forming bearings for the parts, vertical joints connecting the outer and middle sleeves and means for turning the outer sleeves about the joints.

4. The combination of the four parts of the axle, differential gear connecting the two middle parts, universal joints connecting the middle and outer parts, four sleeves forming bearings for the parts, vertical joints connecting the outer and middle sleeves, pinions fixed to the outer sleeves, racks gearing with the pinions, and a cam actuated by the steering-gear traversing the racks.

5. The combination of the four parts of the axle, differential gear connecting the two middle parts, parallelograms connecting the middle and outer parts, joints at the angles of the parallelograms, axial joints in their sides, four sleeves forming bearings for the parts, vertical joints connecting the outer and middle sleeves, pinions fixed to the outer sleeves, racks gearing with the pinions and a cam actuated by the steering-gear traversing the racks.

WILLIAM SYDENHAM.
FREDERICK WATKINSON.
ARTHUR SYDENHAM.

Witnesses:
WILLIAM ROXBURY,
FREDK. HARRIS.